Patented Dec. 15, 1925.

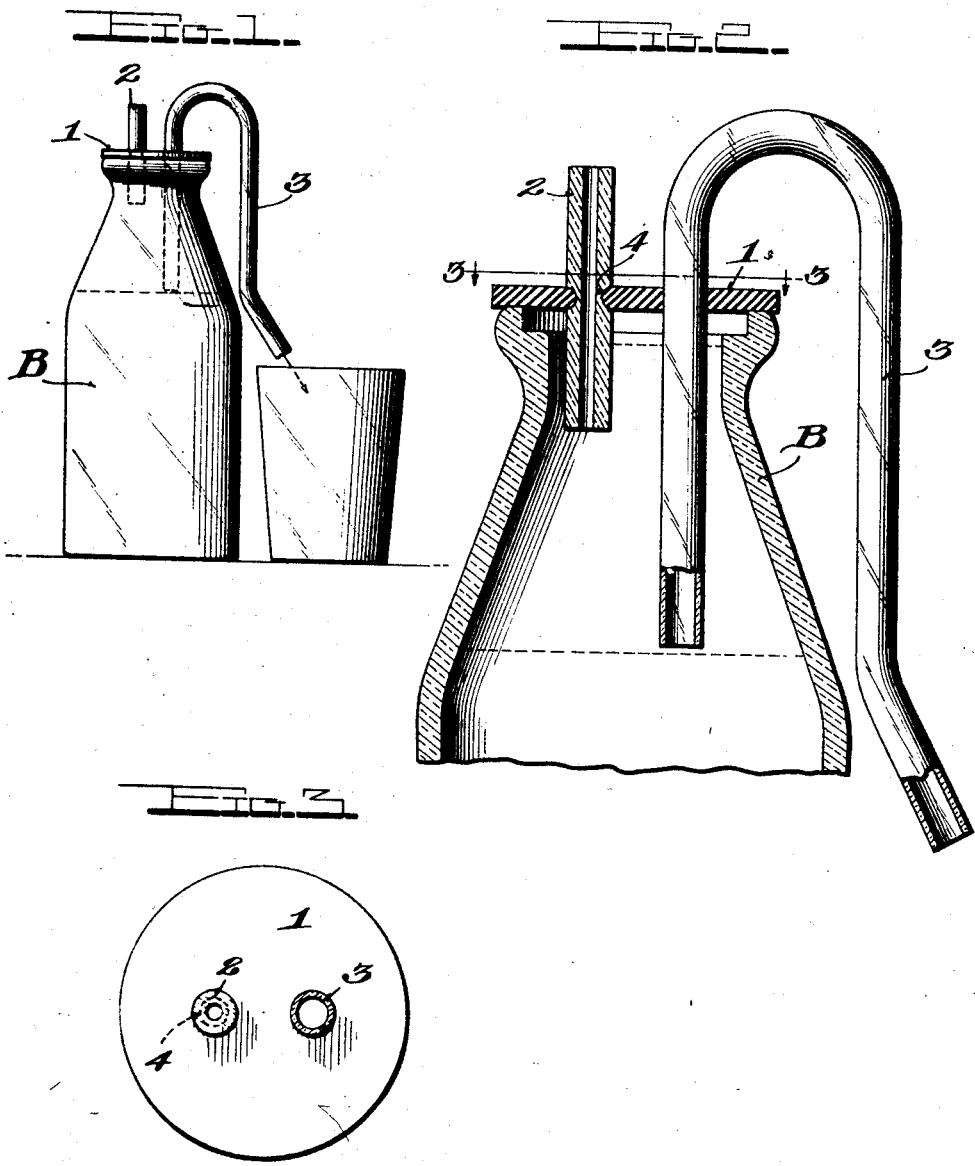

1,566,093

UNITED STATES PATENT OFFICE.

ROY S. INNES, OF MADISON, SOUTH DAKOTA.

CREAM SEPARATOR.

Application filed December 16, 1924. Serial No. 756,227.

*To all whom it may concern:*

Be it known that ROY S. INNES, a citizen of the United States, residing at Madison, in the county of Lake and State of South Dakota, has invented certain new and useful Improvements in Cream Separators, of which the following is a specification.

This invention relates to certain new and useful improvements in cream separators and the primary object thereof is to provide a simplified form of separator which can be economically produced.

A further object of the invention is to provide a cream separator wherein the parts are separable and can be easily and quickly removed and cleaned and maintained clean, and are devoid of dirt collecting ledges or joints.

A still further object of the invention is to provide a cream separator wherein the air supplying tube is also utilized as a means of starting the siphonage action, and which can be also easily and quickly removed from the rubber disk used to create air pressure on the surface of the cream, for purpose of cleaning.

The invention has still further and other objects which will be later set forth and of themselves manifested in the course of the following description.

In the drawings:—

Fig. 1 is a side elevation of the invention applied to a milk bottle,

Fig. 2 is an enlarged detail view partly in section and showing the bottle in fragment, and Fig. 3 is a section on line 3—3 of Fig. 2.

In proceeding in accordance with the present invention a rubber disk 1 is provided of a diameter to seat upon the mouth of a milk bottle B. The disk is formed with a pair of spaced openings in one of which a short straight combined glass air tube and disk compressor 2 is removably mounted, and in the other of which an inverted J-shaped glass siphon tube 3 is removably mounted. For the purpose of preventing axial movement of the air tube relative to the rubber disk upon pressure being exerted thereon to compress the disk 1 the tube is formed with a circular peripheral groove 4 of curved form, and the aperture in the disk receiving the tube is formed of such diameter so as to effect a very tight fit between the tube and disk and to cause the circular wall resultant from the aperture to extend into the groove 4. In operation, the parts being positioned as depicted in Fig. 1, of the drawings, the operator holds the curved end of the siphon tube in his hand and then places his forefinger on the upper end of the air tube to close same against the ingress of air and at the same time presses downwardly on the tube with his forefinger thereby to compress the center of the disk and to correspondingly compress the air between the disk and the surface of the cream, thereby starting siphonage action through the tube 3.

From the foregoing it will be seen that the two tubes are readily separable from the disk, enabling easy and quick cleansing of each of the three parts. No joints or other places are present upon which foreign substances can collect or lodge and the entire surface of each of the three parts is readily accessible for purpose of cleaning and dry wiping. In addition, the three parts being independent of each other any one of same can be replaced when necessary, independently of the others.

What is claimed is:—

In a cream separator, a flexible disk formed for seating on the mouth of a bottle and having a pair of spaced openings therein, an inverted substantially J-shaped siphon tube removably and frictionally secured in one of the openings, and a combined air inlet tube and disk depressor formed independent of the siphon tube and being removably and frictionally secured in the other opening at a distance from the siphon tube and having a circular groove cut into its periphery into which the wall resultant from the said other opening extends whereby to resist axial movement of the air inlet tube relative to the disk, said air inlet tube being spaced from the siphon tube and having its upper end disposed in such relation to the siphon tube so as to permit the operator to seat his hand on the curved part of the siphon tube and to place a finger thereof on said upper end of the air inlet tube and by pressing down on the latter depress the disk.

In testimony whereof I affix my signature.

ROY S. INNES.